Feb. 7, 1961
A. F. KOPASKA
2,970,658
HARROW TRANSPORT
Filed Dec. 22, 1955
2 Sheets-Sheet 1
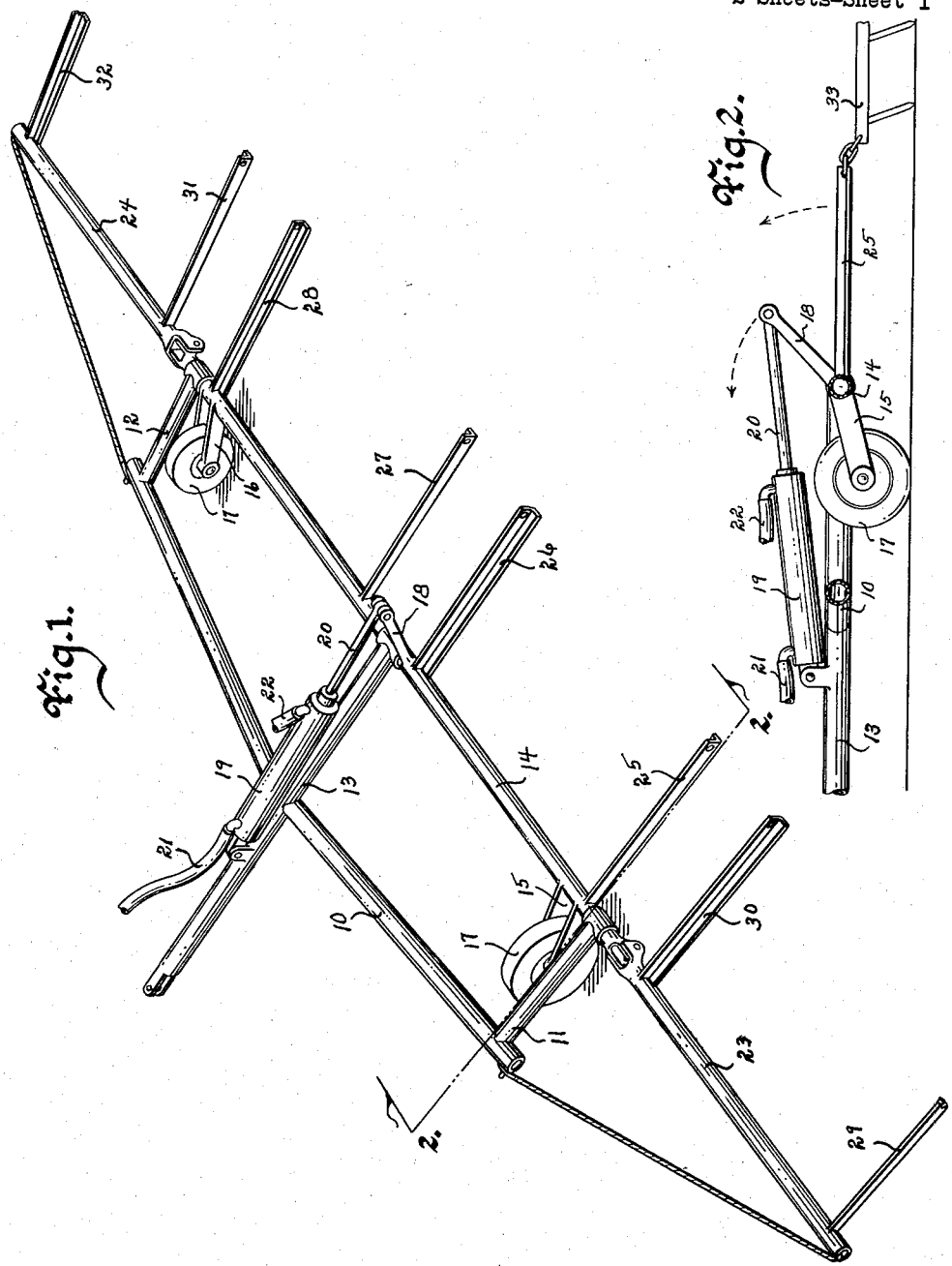
Inventor
Arnold F. Kopaska
by M. Talbert Dick
Attorney
Witness
Edward P. Selly Feb. 7, 1961
A. F. KOPASKA
2,970,658
HARROW TRANSPORT
Filed Dec. 22, 1955
2 Sheets-Sheet 2
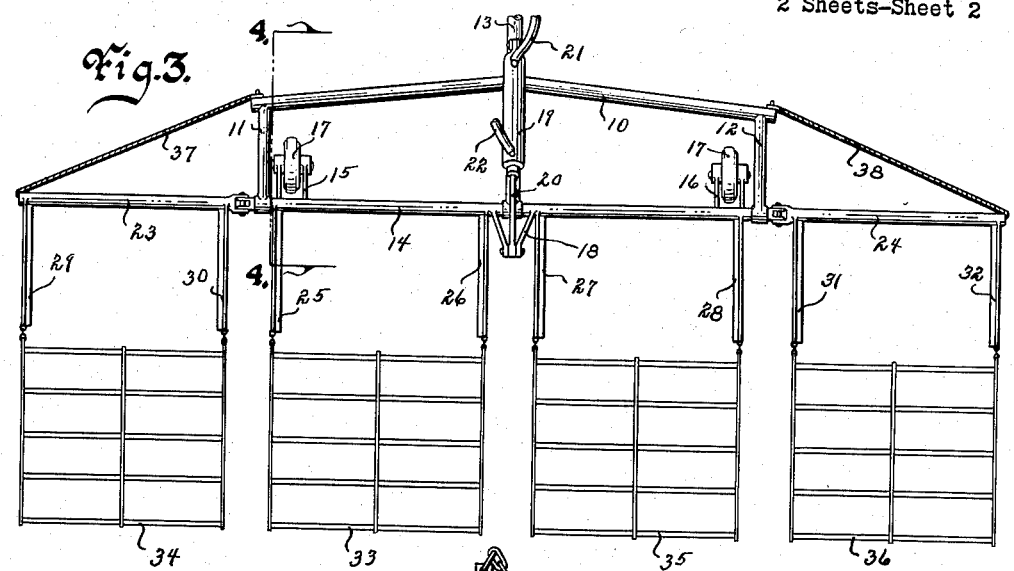
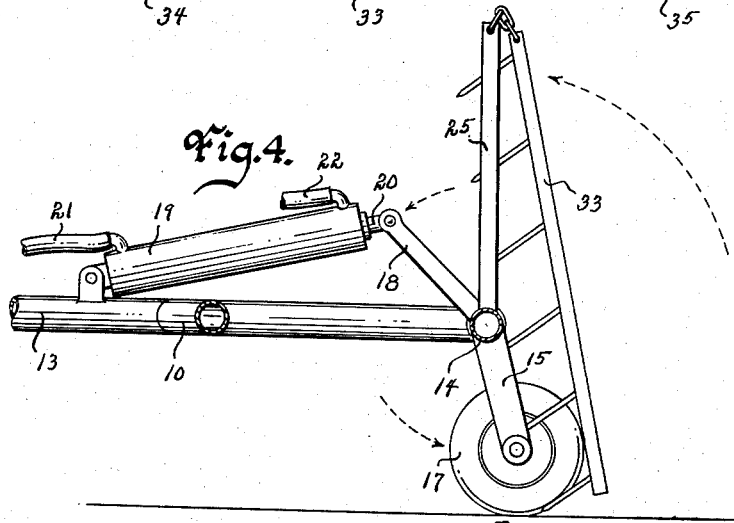
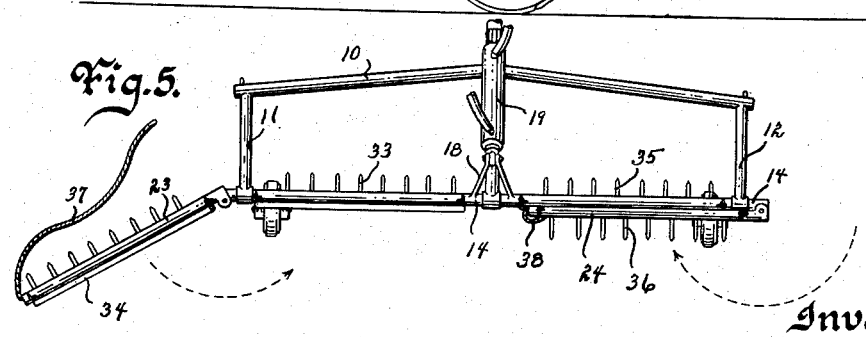
Witness
Edward P. Seeley
Inventor
Arnold F. Kopaska
by M. Talbert Dick
Attorney United States Patent Office 2,970,658
Patented Feb. 7, 1961

2,970,658

HARROW TRANSPORT

Arnold F. Kopaska, Guthrie Center, Iowa

Filed Dec. 22, 1955, Ser. No. 554,790

2 Claims. (Cl. 172—456)

This invention relates to a device for facilitating the transportation of agricultural harrows and more particularly to one that has the drawbar and harrow lifting and carrying means incorporated with a wheeled chassis.

Modern agricultural methods are revolutionizing farm equipment. One reason for this is that machinery has made it easier to till several farms than it was originally to farm one. In most instances the several farms operated by a single individual are scattered, thereby necessitating the transporting of the implements over roadways from one farm to the other. Obviously, such implements as harrows cannot be dragged over roads or highways. Some effort has been made to solve the problem by the use of low slung wagons upon which the harrow sections are stacked. This of course entails considerable time and labor. Some manufacturers have attempted to provide vertical racks, some of which swing forwardly onto the tongue of a wheeled cart. Such devices are hard to operate, and are very heavy and costly. Also they are slow in operation and provide no means for lifting the harrows momentarily to clear obstacles or for the purpose of shedding unwanted debris clogging the harrow teeth.

Therefore, one of the principal objects of my invention is to provide a simple light weight wheeled drawbar chassis that will receive the harrow sections for purpose of transportation over roadways, through narrow gate ways, and like.

A further object of my invention is to provide a harrow transport means that will lift the harrow sections clear of the ground surface they have been engaging.

A still further object of this invention is to provide a harrow transport associated with the drawbar that makes possible the height adjustment of the drawbar means when the device is in an effective harrowing condition.

A still further object of my invention is to provide a harrow transport means that will lift or lower the harrow units by mechanical power means.

A still further object of my invention is to provide a harrow transport means that is easily and quickly operated.

A still further object of this invention is to provide a device for transporting harrow sections that does not require the detachment of the sections from their drawbar means.

Still further objects of my invention are to provide a harrow transport that is economical in manufacture, durable in use and refined in appearance.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a top perspective view of my device extended and ready as a harrow drawbar, Fig. 2 is a side sectional view of the device taken on line 2—2 of Fig. 1, and more fully illustrates its construction, Fig. 3 is a top plan view of the device in harrowing position, Fig. 4 is an enlarged side sectional view of my device taken from line 4—4 of Fig. 1 and illustrates the first movement in lifting the harrow sections, and Fig. 5 is a reduced top view of the device illustrating the second movement of folding the end sections adjacent to the center section of the transport.

In describing my device it will be noted that my device is not only a harrow sections lifting means and a means for transporting the harrow, but also serves as a wheel supported drawbar.

In the drawings I have used the numeral 10 to designate a horizontal W-shaped frame having the two rear side beams 11 and 12 extending rearwardly and the tongue unit 13 centrally located as shown in Fig. 1. The numeral 14 designates the center horizontal drawbar rotatably mounted to the rear free ends of the portions 11, 12 and 13, as shown in Fig. 3. Extending normally forwardly and downwardly when the drawbar 14 is used for drawing harrow sections are two wheel forks 15 and 16 rigidly secured to the drawbar 14. Each fork has a wheel 17. The numeral 18 designates a lever arm extending upwardly and rearwardly from the drawbar 14 when the drawbar is being used to drag harrow sections. The numeral 19 designates an ordinary hydraulic jack having its forward end hinged to the tongue unit 13 and its piston rod 20 hinged to the outer end of the lever arm 18. My device is adapted to be pulled by a farm tractor having the usual hydraulic pump (not shown). The numerals 21 and 22 designate the usual flexible hose conduits of the jack adapted to be connected to the hydraulic pump pressure means of the tractor. Therefore, when the jack is actuated the lever arm 18 will be drawn forwardly or pushed rearwardly. Inasmuch as the lever arm 18 is rigidly secured to the drawbar, the drawbar 14 will be rotated when the lever arm 18 is moved. The numeral 23 designates a second drawbar hinged at its inner end of the left outer end of the drawbar 14. The numeral 24 designates a third drawbar hinged at its inner end to the right outer end of the drawbar 14. When these drawbars are rotated to positions for drawing harrow sections the two drawbars 23 and 24 are capable of vertical swinging hinge action relative to the drawbar 14, and when the drawbars are rotated to positions for carrying the harrow sections, the drawbars 23 and 24 are capable of horizontal swinging hinge action. The numerals 25, 26, 27 and 28 designate spaced apart arms rigidly secured to the drawbar 14. The numerals 29 and 30 designate similar spaced apart arms on the drawbar 23. The numerals 31 and 32 designate similar spaced apart arms on the drawbar 24. The numeral 33 designates an ordinary harrow section having its forward end flexibly secured to the free ends of the arms 25 and 26 as shown in Fig. 3. The numeral 34 designates a harrow section similarly secured to the arms 29 and 30. The numeral 35 designates a harrow section similarly connected to the arms 27 and 28. The numeral 36 designates a harrow section similarly connected to the arms 31 and 32. The numeral 37 designates a cable, rod, chain or like detachably connecting the outer end of the drawbar 23 to the forward corner of the frame 10 as shown in Fig. 3. A similar member 38 detachably connects the outer end of the drawbar 24 to the other corner of the frame 10.

The practical operation of the device is as follows: When the hydraulic jack is expanded and the drawbars 14, 23 and 24 are all in a common longitudinal plane, the arms 25, 26, 27, 28, 29, 30, 31, and 32 will all be extending horizontally rearwardly. The harrow sections connected to the outer ends of these arms will be in harrowing positions as shown in Fig. 3. The three drawbars, at this time will be performing the function of drawbars and will be positioned and supported above the ground by the wheels, 17. If it is desired to maintain the forward ends of the harrow sections lower or higher than normal, it is only necessary to adjust the position of the lever arm 18 by the hydraulic jack control. In moving from one adjacent field to the other, it well may be necessary to lift the harrow sections from the ground. All that is necessary of the tractor operator on the tractor is to control the hydraulic fluid to contract the hydraulic jack. This action rotates the drawbars bringing the arms to vertical positions as shown in Fig. 4. The arms obviously lift all of the harrow sections from the ground and the only contact with the ground by the unit are its wheels 17. All this may be accomplished without the vehicle operator getting down from the tractor. In fact the harrow sections may be thus elevated from the ground or replaced on the ground while the tractor and my device are in motion. This action is highly desirable in ridding the teeth of the harrow sections of collected matter and debris. The harrow sections may be only momentarily elevated to perform such cleaning action or to clear obstacles. When the device is transported down a roadway or through a gate a third duty must be performed, i.e., the brace members 37 and 38 are detached and the drawbars 23 and 24 horizontally swung and folded rearwardly and inwardly to positions adjacent the drawbar 14, as illustrated in Fig. 5. When this is done, all the harrow sections are elevated and the unit is relatively narrow for passage over roadways, through gates and like.

While I have shown the power lowering and raising of the harrow sections by a hydraulic jack means, other suitable means may be employed such as motor power levers, crank arms and like. The wheels 17 may be operatively connected by any suitable means to the frame 10. However, by the forks 15 and 16 extending from the drawbar 14, as shown, the rotation of the drawbar to raise the harrow sections will also raise the drawbar relative to the ground and the harrow sections will be raised proportionately, thereby permitting the use of relatively short arms on the drawbars. Conversely when the drawbar 14 is rotated in the opposite direction to lower the harrow sections, the drawbars will be lowered toward the ground surface.

Some changes may be made in the construction and arrangement of my Harrow Transport without departing from the real spirit and purpose of my invention, and it is my intention to cover by my claims, any modified forms of structure or use of mechanical equivalents which may be reasonably included within their scope.

I claim:

1. An implement carrier comprising in combination, an implement supporting frame, means mounting said frame for movement about a horizontal axis from a lowered position when the implement is in ground engaging position to a vertical position extending upwardly from said axis when the implement is being transported, said frame including a central section and a pair of end sections, and hinge means connecting said sections for upward swinging movement of the end sections relative to the central section when the frame is in lowered position and for horizontal swinging movement of the end sections relative to the central section to a position in angular relation to the central section when the frame is in vertical transport position.

2. An implement carrier comprising in combination, an implement supporting frame having an elongated front member and means laterally extending from said elongated front member, means mounting said frame for movement about a horizontal axis so that the laterally extending means lie in a rearwardly extending horizontal position overlying the implement when the implement is in ground engaging position, means for connecting the implement to said frame, means for swinging said frame from said horizontal position to a vertical transport position whereby the implement is lifted from a ground engaging position to a transport position, said frame including a central section and a pair of end sections, and hinge means connecting said sections for upward swinging movement of the end sections relative to the central section when the frame is in lowered horizontal position and for horizontal swinging movement of the end sections relative to the central section to a position in angular relation to the central section when the frame is in vertical transport position.

References Cited in the file of this patent

UNITED STATES PATENTS

| | | |
|---|---|---|
| 1,157,812 | Sharp | Oct. 26, 1915 |
| 2,526,028 | Johnson | Oct. 17, 1950 |
| 2,613,581 | Pretzer | Oct. 14, 1952 |
| 2,619,016 | Dooley | Nov. 25, 1952 |
| 2,706,880 | Steuerwald | Apr. 26, 1955 |
| 2,707,857 | Bobrowski | May 10, 1955 |